US005598523A

United States Patent [19]
Fujita

[11] Patent Number: 5,598,523
[45] Date of Patent: Jan. 28, 1997

[54] METHOD AND SYSTEM FOR DISPLAYED MENU ACTIVATION USING A MATCHING DISTINCTIVE ARRANGEMENT OF KEYPAD ACTUATORS

[75] Inventor: Yosuke Fujita, Allendale, N.J.

[73] Assignee: Panasonic Technologies, Inc., Princeton, N.J.

[21] Appl. No.: 608,217

[22] Filed: Feb. 28, 1996

Related U.S. Application Data

[63] Continuation of Ser. No. 221,182, Mar. 31, 1994, abandoned.

[51] Int. Cl.⁶ .................................................. G06F 3/00
[52] U.S. Cl. ............................ 395/352; 348/114; 348/13
[58] Field of Search ................................. 395/155–161; 345/117–120, 146, 902, 168–172, 173–178; 364/146, 188; 348/734, 114, 7–13; 340/541–567; D14/124; D10/104

[56] References Cited

U.S. PATENT DOCUMENTS

| | | | |
|---|---|---|---|
| D. 341,837 | 11/1993 | Curbbun | D14/124 |
| D. 342,259 | 12/1993 | Darbee et al. | D14/124 |
| D. 364,872 | 12/1995 | Schwartz | D10/104 |
| D. 365,100 | 12/1995 | Farinelli et al. | D14/124 |
| 4,556,904 | 12/1985 | Monat | 348/734 X |
| 4,712,191 | 12/1987 | Penna | 395/156 |
| 4,763,356 | 8/1988 | Day, Jr. et al. | 395/156 X |
| 4,797,854 | 1/1989 | Nakazaki et al. | 395/155 |
| 4,811,240 | 3/1989 | Ballou et al. | 395/155 |
| 4,825,209 | 4/1989 | Sasaki et al. | 348/734 |
| 4,827,410 | 5/1989 | Corren | 395/155 |
| 4,866,638 | 9/1989 | Cosentino et al. | 395/159 |
| 4,873,643 | 10/1989 | Powell et al. | 395/156 X |
| 4,943,906 | 7/1990 | Tajima et al. | 364/189 X |
| 4,959,721 | 9/1990 | Micic et al. | 345/146 X |
| 5,038,401 | 8/1991 | Inotsume | 345/146 X |
| 5,056,029 | 10/1991 | Cannon | 395/155 |
| 5,086,385 | 2/1992 | Launey et al. | 364/188 |
| 5,113,517 | 5/1992 | Beard et al. | 395/159 X |
| 5,250,929 | 10/1993 | Hoffman et al. | 345/146 |
| 5,251,125 | 10/1993 | Karnowski et al. | 345/146 X |
| 5,260,744 | 11/1993 | Nishimori | 395/155 |
| 5,261,042 | 11/1993 | Brandt | 395/156 |
| 5,276,794 | 1/1994 | Lamb, Jr. | 395/149 |
| 5,276,795 | 1/1994 | Hoeber et al. | 395/156 |
| 5,367,316 | 11/1994 | Ikezaki | 348/734 X |
| 5,373,324 | 12/1994 | Kuroda et al. | 345/146 X |
| 5,382,983 | 1/1995 | Kwoh et al. | 348/716 |
| 5,396,546 | 3/1995 | Remillard | 348/13 X |
| 5,404,393 | 4/1995 | Remillard | 348/13 X |
| 5,412,773 | 5/1995 | Carlucci et al. | 395/156 |

OTHER PUBLICATIONS

Peter Lambert, "'It's TV, Stupid,' Cable, Computer Executives Warn", Multichannel News, Sep. 20, 1993, p. 40.

Michael Naël, "Design Issues for Usability of Residential Multifunction Terminals", *IEEE Journal on Selected Areas in Communication*, vol. 9, No. 4, pp. 518–523, May, 1991.

Masao Ikezaki et al., "A New Display Pointing Method for Systemized Home Equipments", *IEEE Transactions on Consumer Electronics*, vol. 36, No. 3, pp. 595–601, Aug., 1990.

Microsoft Windows Calculator, Microsoft Corp., 1992, Screen pp. 1–2.

*Primary Examiner*—Mark R. Powell
*Assistant Examiner*—John E. Breene
*Attorney, Agent, or Firm*—Ratner & Prestia

[57] ABSTRACT

An apparatus for controlling equipment from a remote location is disclosed. A control keypad having a distinctive key arrangement such as an array is used to interact with a display device (e.g. TV), located independently from the control keypad. A control menu is displayed on the display device where the control menu has a background image which substantially matches the distinctive arrangement of the keypad, and a foreground image which is overlaid on the background image to associate menu options with each actuator on the keypad. Finally, responsive to the option selected by the keypad, the corresponding function is executed. The menu system is implemented in the context of a home-bus system such as CEBus.

16 Claims, 10 Drawing Sheets

MENU ON TV

METHOD AND SYSTEM FOR DISPLAYED MENU ACTIVATION USING A MATCHING DISTINCTIVE ARRANGEMENT OF KEYPAD ACTUATORS

This application is a continuation of application Ser. No. 08/221,182 filed Mar. 31, 1994, now abandoned.

FIELD OF THE INVENTION

The present invention generally relates to remote interfacing and, more particularly, it relates to the interrelationship between menu displays and remote control keypads.

BACKGROUND OF THE INVENTION

A common system for selecting on-screen menu options is the use of cursor buttons. One of the items on the screen is always highlighted. A user generally has to press the cursor buttons several times to highlight to the desired item. Then the user has to press a select (or enter) button to indicate to the system that the highlighted item has been selected. A major drawback of this technique is the inconvenience of multiple button pressing.

Another way to select menu items on a TV screen is to detect the direction of the remote controller. Generally, this type of system detects the direction of the remote controller and highlights a corresponding item on the screen. The drawbacks of this system include that 1) it is not easy to select the desired item among many choices, and 2) the system cost may be expensive because of the complicated devices needed to detect the direction of the remote controller and to convert detailed changes in direction into cursor movement.

A generally used system for selecting items on a CATV menu is to use a numeric key pad on the remote controller. Every available option on the on-screen menu has an associated number and, for selection, the user presses the corresponding numeric button on the remote controller.

SUMMARY OF THE INVENTION

The present invention involves an apparatus for controlling equipment from a remote location. The apparatus includes a control keypad with multiple actuators in a distinctive arrangement and a display device, located remotely from the control keypad, for displaying a control menu. A control processor generates the control menu such that the control menu presents multiple options in a format which substantially matches the distinctive arrangement of the actuators on the control keypad. Finally, responsive to an actuator, a device executes the corresponding selected control menu option.

BRIEF DESCRIPTION OF THE DRAWINGS

The invention is best understood from the following detailed description when read in connection with the accompanying drawing, in which.

DETAILED DESCRIPTION

The present invention involves a system with which users of home systems can easily select menu items on a display screen to control and/or monitor devices of a home system. One aspect of the present invention includes a display function, remote control function and menu generating function. These respective functions can be implemented, for example, using a television receiver, an infra-red (IR) remote controller and a personal computer (PC).

An important feature of the present invention is to provide an intuitive correspondence and similarity between on-screen menu options and remote control selection of those options.

Figure 1:
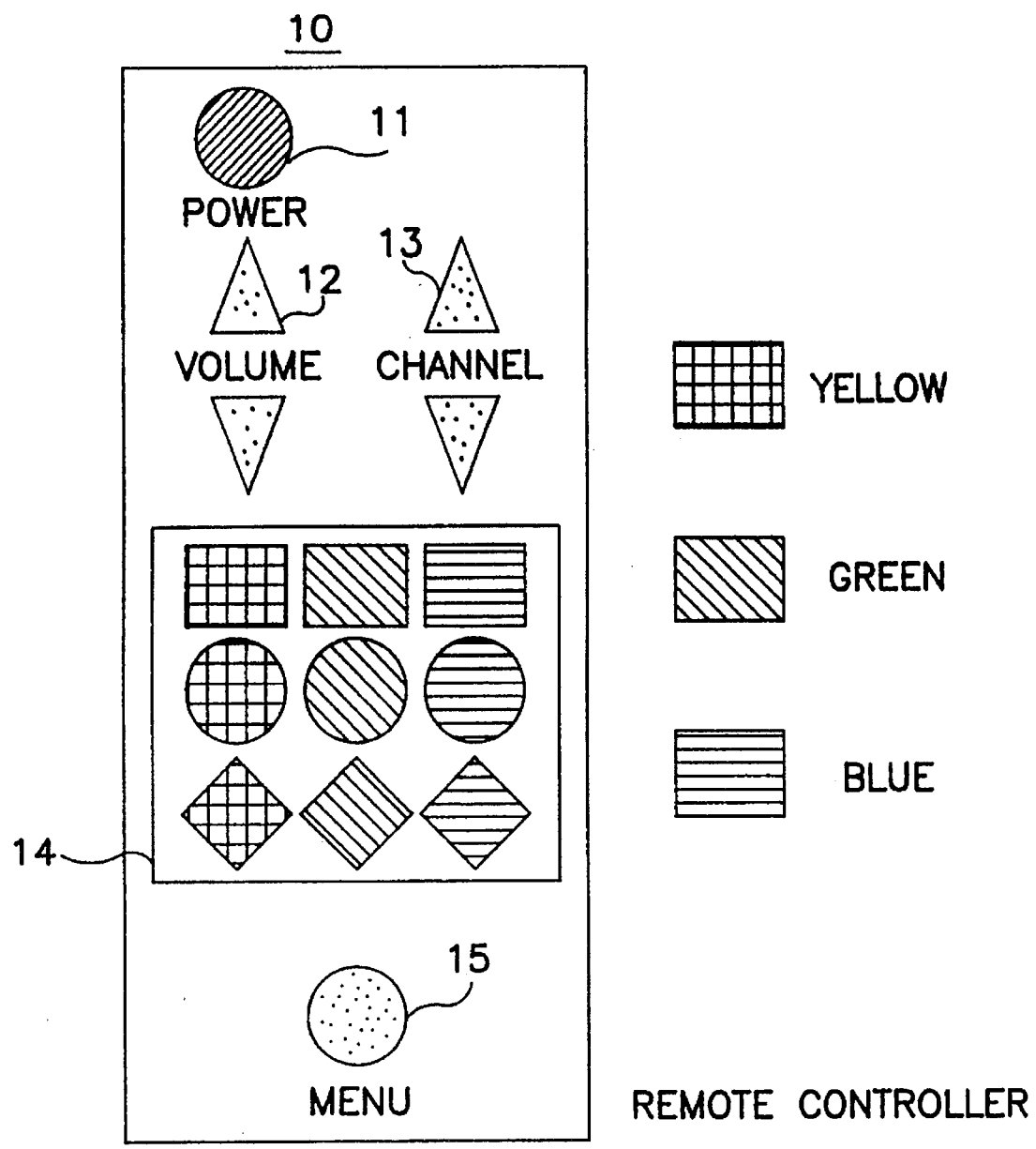
FIG. 1 is an exemplary embodiment of a remote control keypad suitable for use with the present invention.
Figure 2:
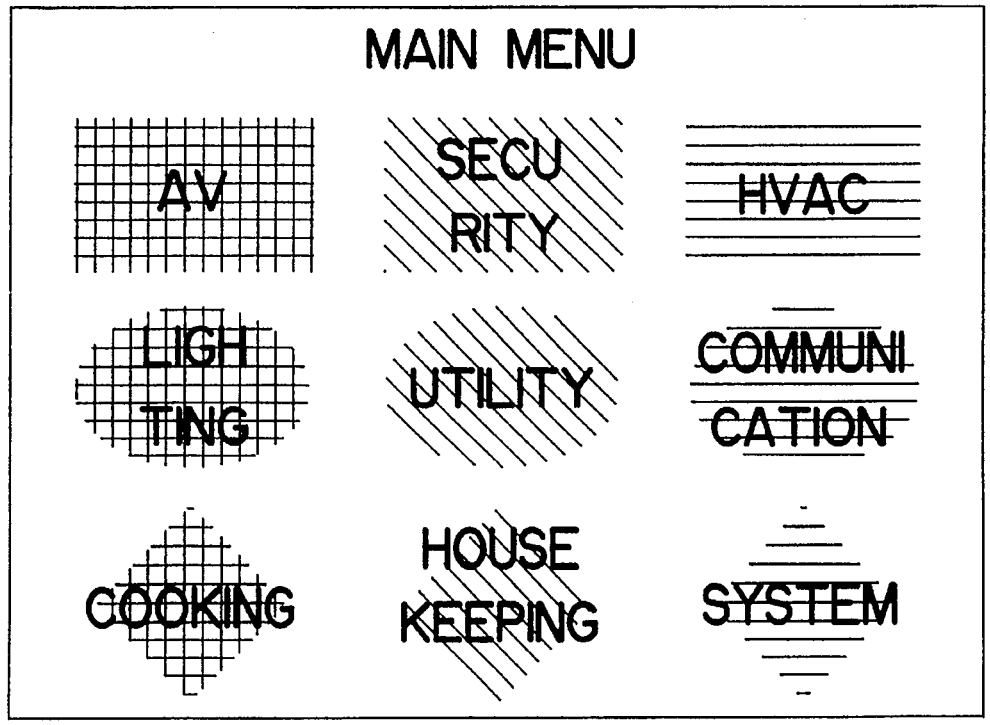
FIG. 2 is an exemplary embodiment of a main menu displayed for use with the remote control of FIG. 1.

FIGS. 1 and 2 illustrate exemplary embodiments of a remote control keypad 10 and the corresponding display menu configuration 20, respectively, for use with the present invention.

The remote control keypad 10, as shown in FIG. 1, includes buttons for typical control functions such as power 11, volume 12 and channel 13. In addition, however, keypad 10 includes a section having an array of buttons 14 which vary in their attributes as well as a menu button 15 for initially calling up a menu or closing a menu down.

It should be noted that all or some of the buttons on remote controller 10 may be implemented using a touch-sensitive cover which simply depicts the button configuration and/or their respective attributes. Such a cover aids in making the remote control durable when being frequently handled by children.

Continuing with keypad 10, each button in the array 14 has associated attributes which allows a user to quickly identify and match the button with an option on the displayed menu. For example, in the exemplary embodiment of keypad 10, the array of buttons 14 is arranged in a 3×3 motif in which each column is the same color (yellow, green, and blue) and each row is the same shape (rectangle, circle, rhombus). In the exemplary embodiment, the associated attributes of the buttons have a substantial match to the configuration of the displayed menu 20.

Moreover, although the exemplary embodiment of the present invention uses the above colors and shapes, it is not limited to these attributes—other colors, shapes, and like attributes would be suitable. Also, although the present invention is shown employing a 3×3 array of buttons, many other array sizes would be suitable such as 3×4, 4×3, 4×4, etc.; however, at some point, the larger the array (i.e., the more buttons) actually reduces the ability of a user to quickly identify and match keypad buttons with menu options.

As shown in FIG. 2, the exemplary embodiment of the main menu, in accordance with keypad 10, displays a 3×3 array providing 9 options for selection: 1) audio/visual (AV), 2) Security, 3) heating/ventilation/air conditioning (HVAC), 4) Lighting, 5) Utility, 6) Communication, 7) Cooking, 8) Housekeeping, 9) System.

Each option on the menu has attributes associated therewith which are designed to substantially match those on keypad 10. For example, the first row of menu 20 shows rectangles, the second row shows circles, and the third row shows rhombuses. Additionally, all shapes in the left column of menu 20 are yellow, all shapes in the center column are green, and all shapes in the right column are blue. Again, buttons having substantially the same configuration as the menu are on the remote controller keypad 10.

It should be noted that, if color is one of the attributes used for ease of identification of the menu options, the colors selected for text/graphics indicating the option, the associated shape and the background of the menu should be selected with luminance levels conducive to good contrast.

Figure 3:
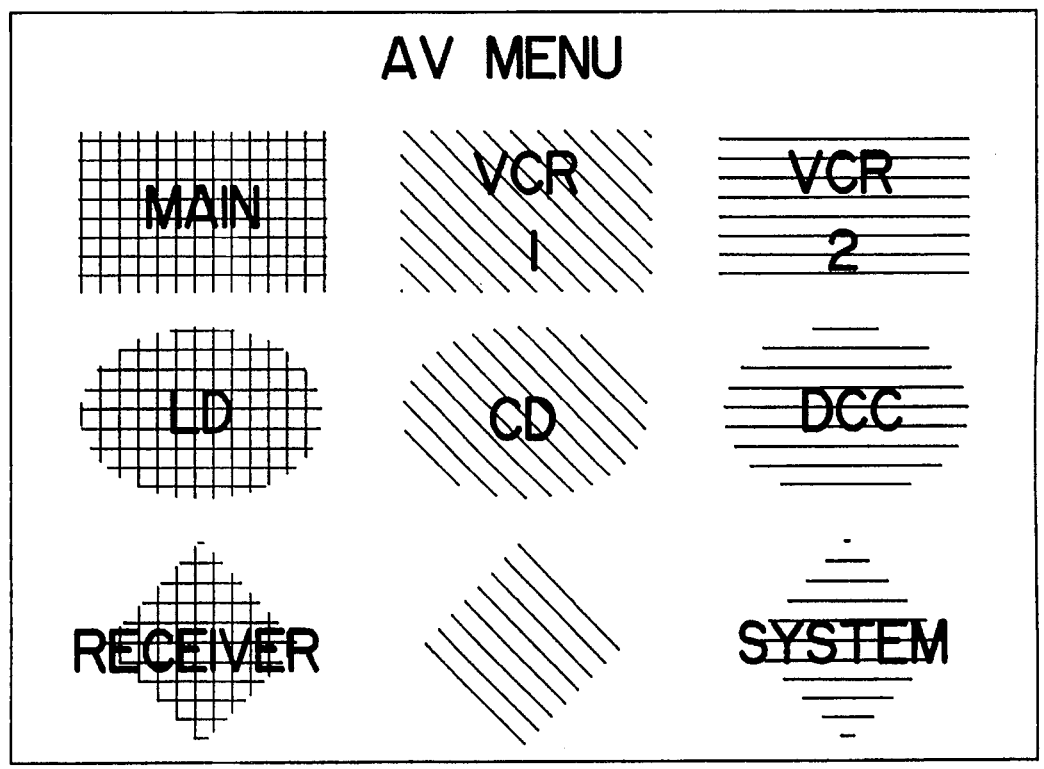
FIG. 3 is an exemplary embodiment of an audio-visual (AV) control menu displayed for use with the remote control of FIG. 1.
Figure 4:
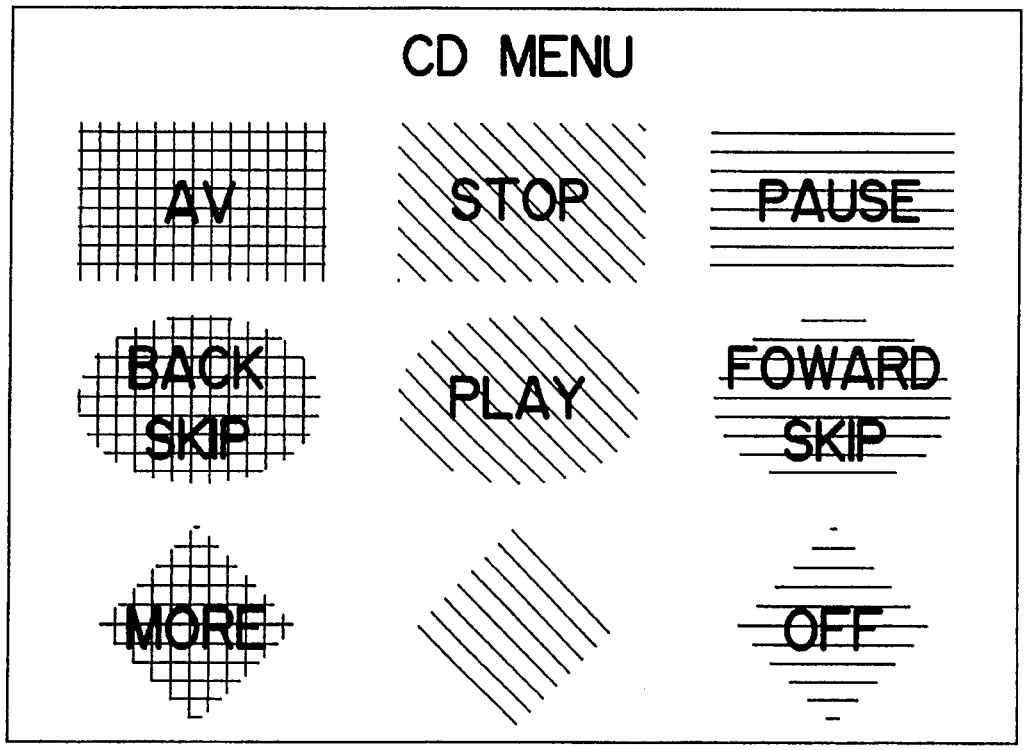
FIG. 4 is an exemplary embodiment of a compact disk (CD) control menu displayed for use with the remote control of FIG. 1.

Continuing with FIGS. 2–4, if a user presses the button in the first row and first column, (i.e., the yellow rectangle which has the same attributes as the displayed "AV" item), the remote controller sends out, via an IR transmission, a message simply indicating that the depressed button position is first row and first column. It should be noted that the remote controller does not know that the button in the first row and first column is for "AV Menu". The translation of this selection occurs in the processor which generates the menus. That the remote controller is not limited to a particular function provides additional flexibility in the present invention such that new items can be programmed into a menu without affecting the usefulness and operability of the predetermined remote control keypad 10.

Continuing, when the first row, first column button is pressed, the menu generating processor then generates the "AV Menu", illustrated in FIG. 3, and shows it on the TV instead of "Main Menu". Again, each menu displayed on the TV, although listing different options, depicts substantially the same arrangement of attributes contained on the remote control. As seen, the "AV Menu" includes 8 items: 1) Main, 2) VCR-1, 3) VCR-2, 4) LD, 5) CD, 6) DCC, 7) Receiver, and 8) System. In this example, one background picture does not have an item to be selected.

In this case, suppose the user presses the button in the second row and second column, which is a yellow rectangle corresponding to "CD" item on the displayed menu, the menu generating processor activates the compact disc player and generates the "CD Menu" and shows it on the television (TV) display, as illustrated in FIG. 4. This menu has eight selections 1) AV, a selection which allows the user to return to the audio visual menu, and seven control "buttons" for the compact disc player: 2) Stop, 3) Pause, 4) Back, 5) Skip, 6) Play, 7) Forward Skip, 8) More, and 9) Off. The user can easily control the CD player using the displayed menu even if the CD player is in another room. It should be noted that the "Play" command may be a macro command including turning on the receiver in the user's room, selecting "CD" mode and starting to play the CD. While listening to the music of CD, the user does not need the menu; therefore, the user can shut off the menu by pressing the menu button on the remote controller 10.

Figure 5:
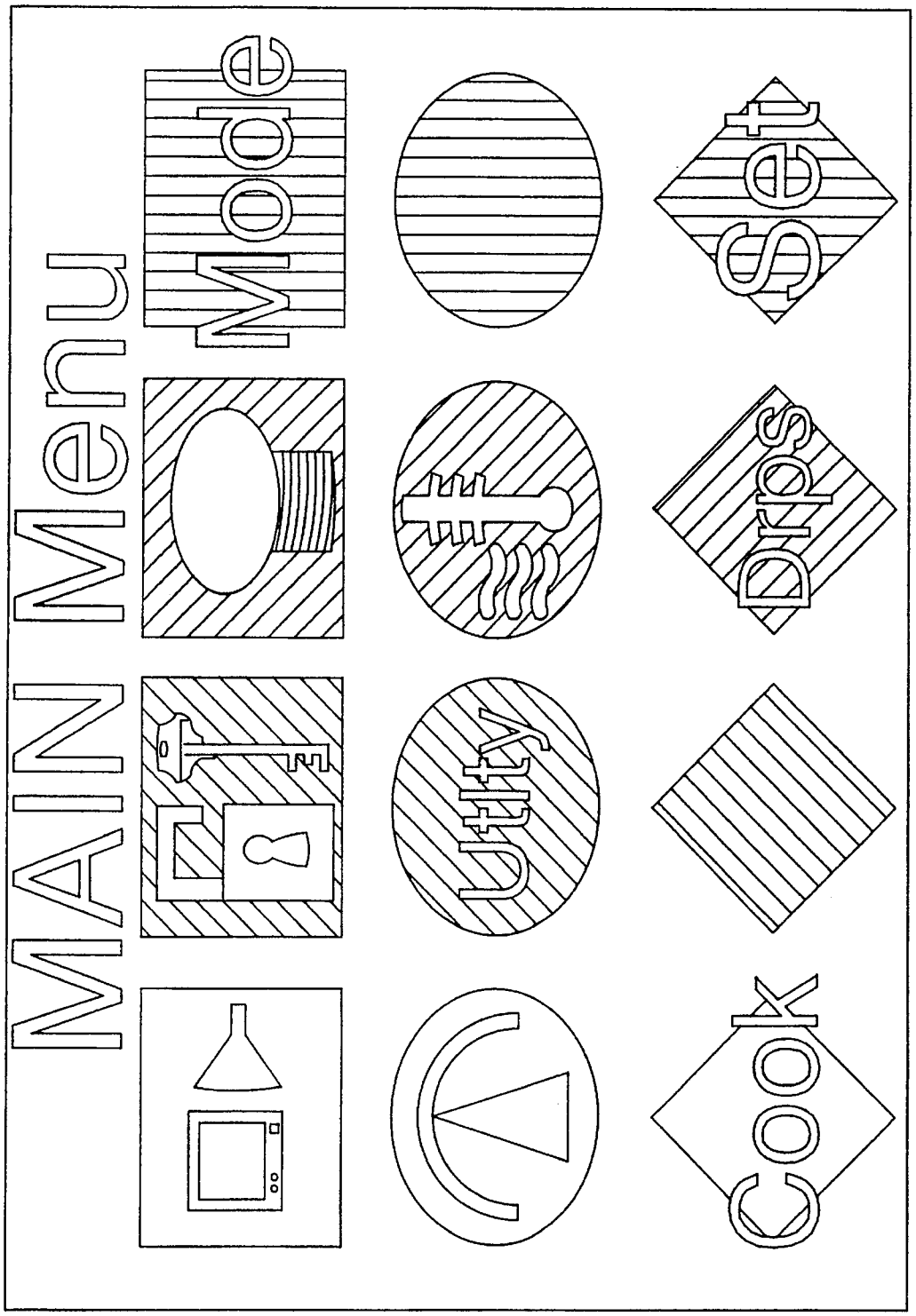
FIG. 5 is an alternate embodiment of the main using graph rather than text.
Figure 6:
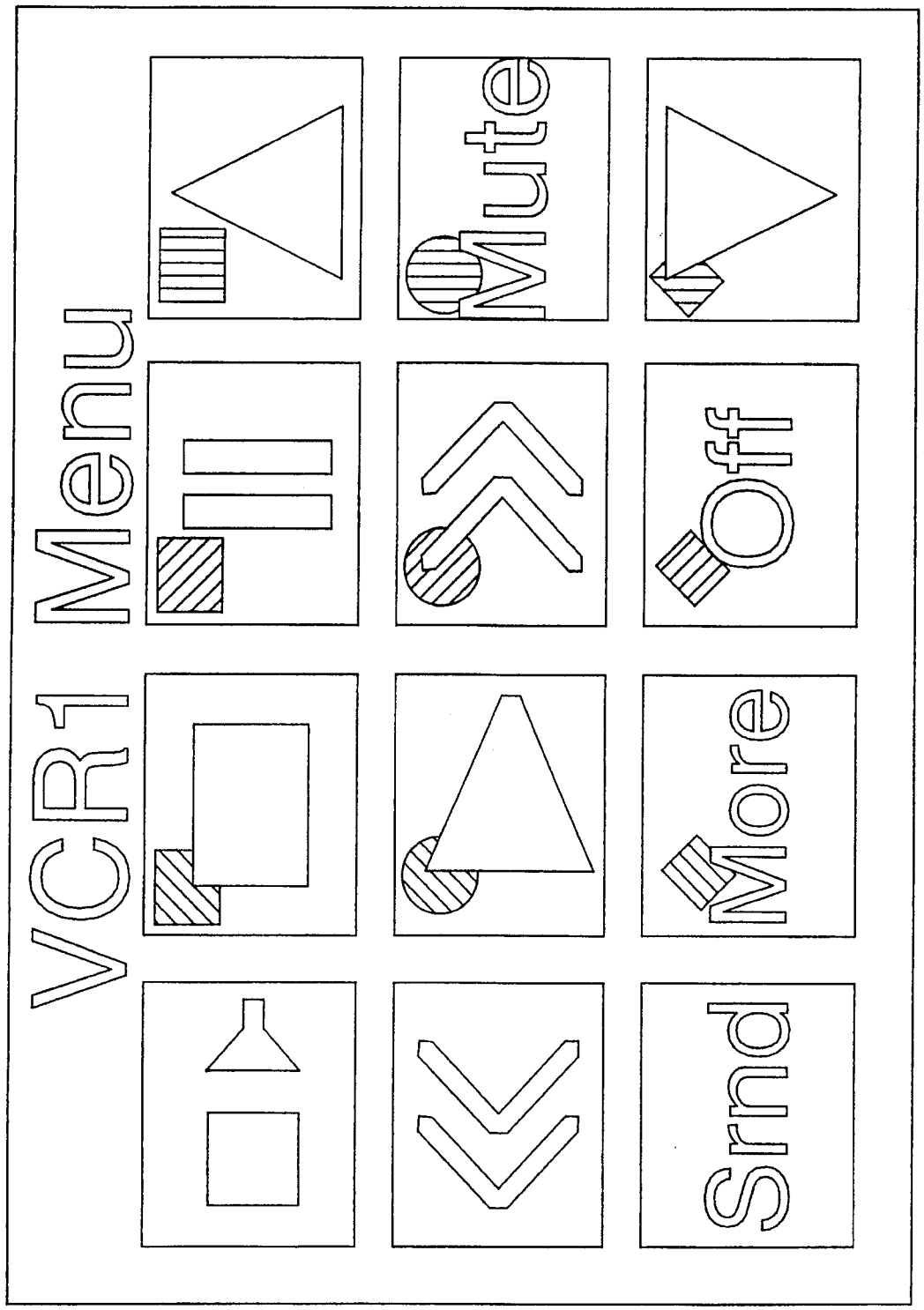
FIG. 6 is an alternate embodiment of a VCR menu using graphics rather than text.

It should be noted that although in FIGS. 2–4 each available option on the menu is indicated using text, in an alternate embodiment, graphics could be used to indicate the available functions from which selections can be made. FIGS. 5 and 6 show exemplary displays for the main menu and a VCR menu which use graphics rather than text to indicate the available functions/options. In the alternate embodiments, the displayed menus include 4×4 arrays. Additionally, in FIG. 6, the attributes associated with the available options are proximately located to the graphically-represented option rather than directly configured in the foreground or background. For example, the yellow rectangle in row one, column two is located above and to the left of the option.

Since each menu-item corresponds to a button on the remote controller 10 by its position and/or attributes, the users can select a menu option by simply pressing just one corresponding button. This single action selection provides for simple and easy manipulation of the system. No matter what the on-screen menu options are, the remote controller need not know them. The remote controller can be inexpensive because the buttons on the remote controller may be the same kind of mechanical buttons as regular remote controllers.

Figure 9:
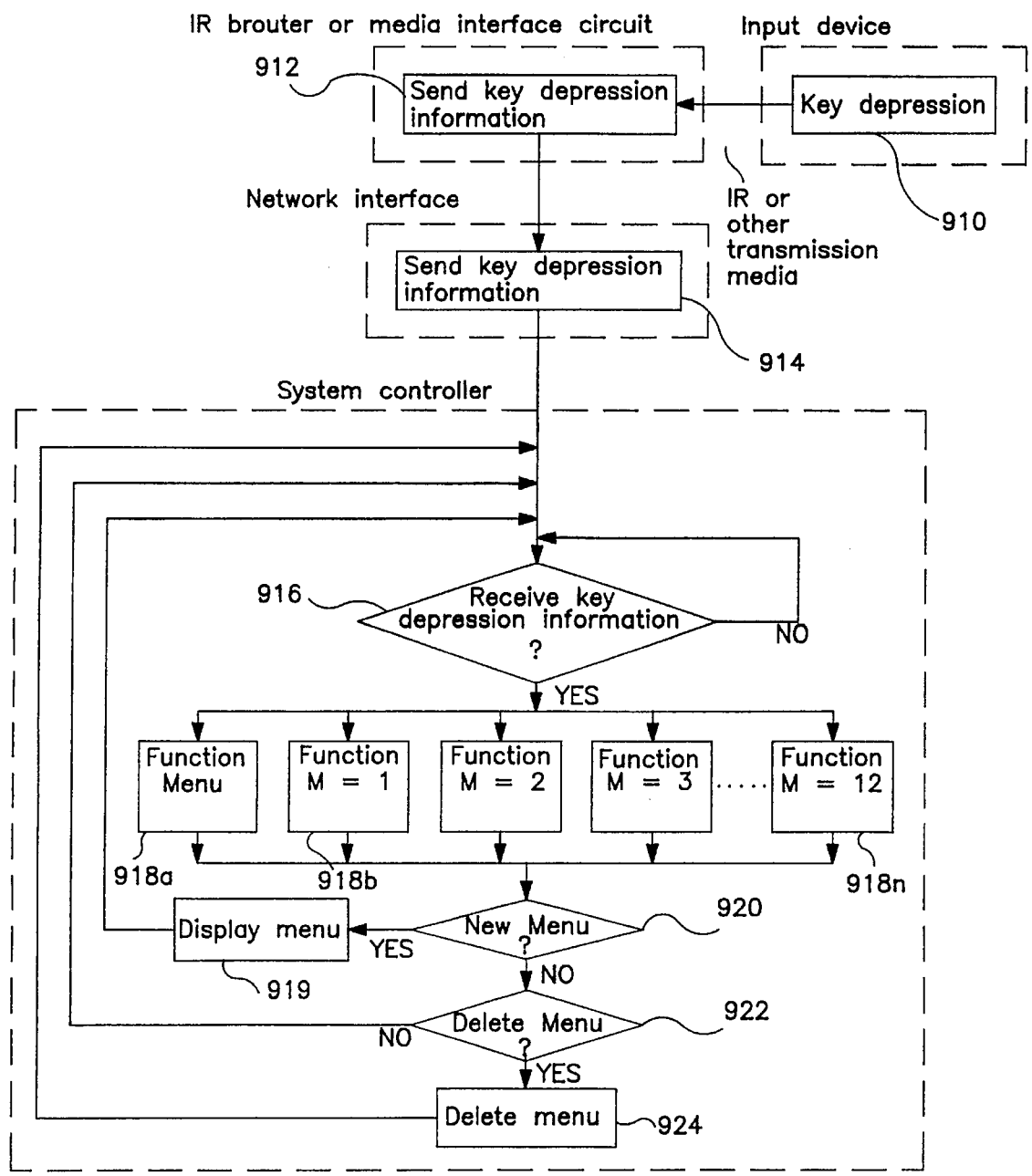
FIG. 9 is a flowchart showing an exemplary sequence of commands selected/executed when using the present invention.

FIG. 9 is a flowchart illustrating an exemplary sequence of options (or functions) selected when employing the present invention. It should be noted that, although in the exemplary embodiment certain steps are represented as occurring within a particular device (e.g., step 914 occurs in network interface), it is contemplated that the steps may be rearranged, merged into a single device or further separated into more devices.

Referring to FIG. 9, first, in step 910, a key corresponding to a selected option is depressed. The information relating to the depressed key is sent to an IR brouter or other media interface via an IR transmission or other suitable transmission method (e.g. voice recognition) which is represented by the arrow between step 910 and 912.

In turn, the media interface circuit sends the key depression information, as indicated in step 912, to a network interface which is represented by the dotted line around step 914.

Next, the network interface transmits the received key depression information to the system controller, represented by the dotted line around steps 916–924. Within the system controller it is determined, at step 916 whether key depression information has been received. If no information has been received, the system controller waits at step 916; if new information has been received, the system controller, in view of the menu known to have been displayed, proceeds to decode and execute, as represented by steps 918a–918n, the function related to the received key information.

Once completed, at step 920, the system controller determines whether a new menu has been requested: if the answer is no, the procedure jumps to the delete menu inquiry, step 922, otherwise the procedure executes a function which displays the requested new menu as shown in step 919 and returns to step 916. The new menu can be a starting menu (e.g. the main menu shown in FIG. 2) if there is no current menu, a device control menu (e.g. the CD control menu shown in FIG. 4) or any other menu suitable for function selection in a particular network.

If, at step 922, it is determined that the user desires to delete the current menu, the menu is deleted as shown in step 924 and the procedure, waiting for the next command, returns to step 916; otherwise, the procedure immediately returns to step 916 from step 922.

In addition to the basic display menu and select, because the menu is actually a video signal transmitted on a specific channel, as described in detail below, if the display device (TV) or another device (VCR) connected to the system provides for a picture-in-picture (PIP) feature, the present invention is still operable. In the case of PIP, the menu can be displayed in either the large or small window, in either mode, selection of the available options is fully functional.

Once a button is pressed, the signal sent from the remote controller 10 is received, delivered to the menu generating processor and executed. As mentioned, in some cases, the processor sends control commands to other devices connected to the network (e.g., CD, Security). It may generate and send for display, another on-screen menu (e.g., main to AV). It may generate, and send for display an updated menu which indicates the status of the system or devices. Or, it may turn off the on-screen menu.

To execute the various commands available in the menus, the menu generating processor has access to not only the display device (TV) including a remote receiver but also to the CD player, the VCR(s), the security system, etc.

In the present invention, a CEBus coaxial network is used as a transmission medium. The CEBus is a home communication and control standard developed by the Electronic Industry Association. The CEBus standard provides for establishing a local area network, or LAN, over five physical distribution media: a power line (PLBus), twisted pair (TPBus), coaxial cable (CXBus), infrared light (IRBus), and lower power radio (RFBus).

Figure 7A:
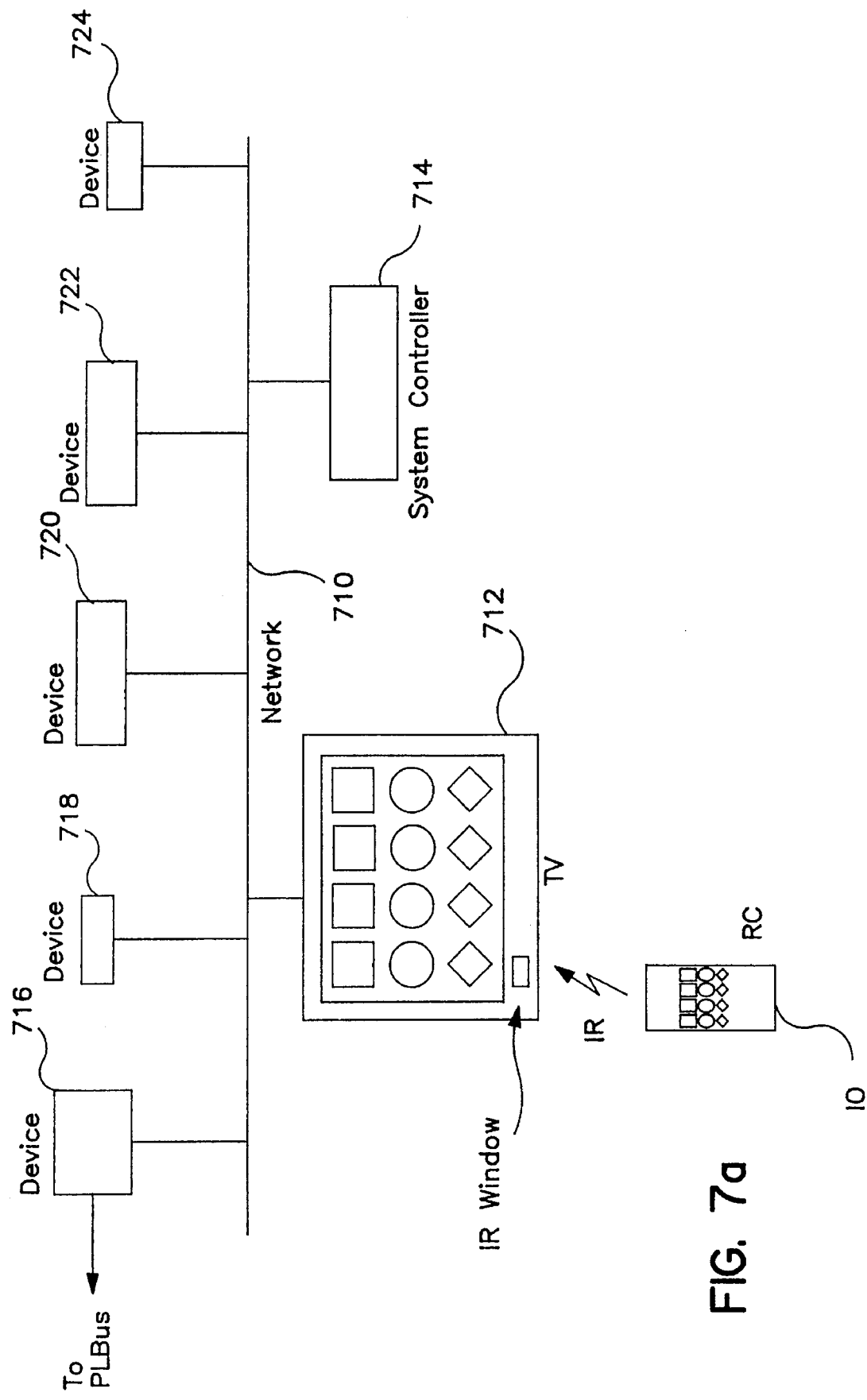
FIG. 7a is a high level functional block devices use to implement the present invention. diagram of the network interconnections of exemplary

FIG. 7a shows the basic concept of connection and operation of the present invention employing a distribution network implemented with a CEBus. As shown in FIG. 7a, a network 710 interconnects the TV 712, the system controller 714 (which serves to generate menus) and all other devices 716–724 which can be controlled via the menu system. Remote controller 10, via IR signals, sends commands to TV 712 (or an appropriate interface) which, in turn, formats the commands and delivers them, via network 710, to system controller 714.

It should be noted that in the exemplary embodiment of the present invention, the remote controller 10 communicates with the remote interface (not shown) within TV 712. TV 712, in turn, communicates with an interface box 718 (which may be inside, along side or outside TV 712) for converting the received IR command into a packet to be transmitted along a control channel of the network 710 (CEBus).

Figure 7B:
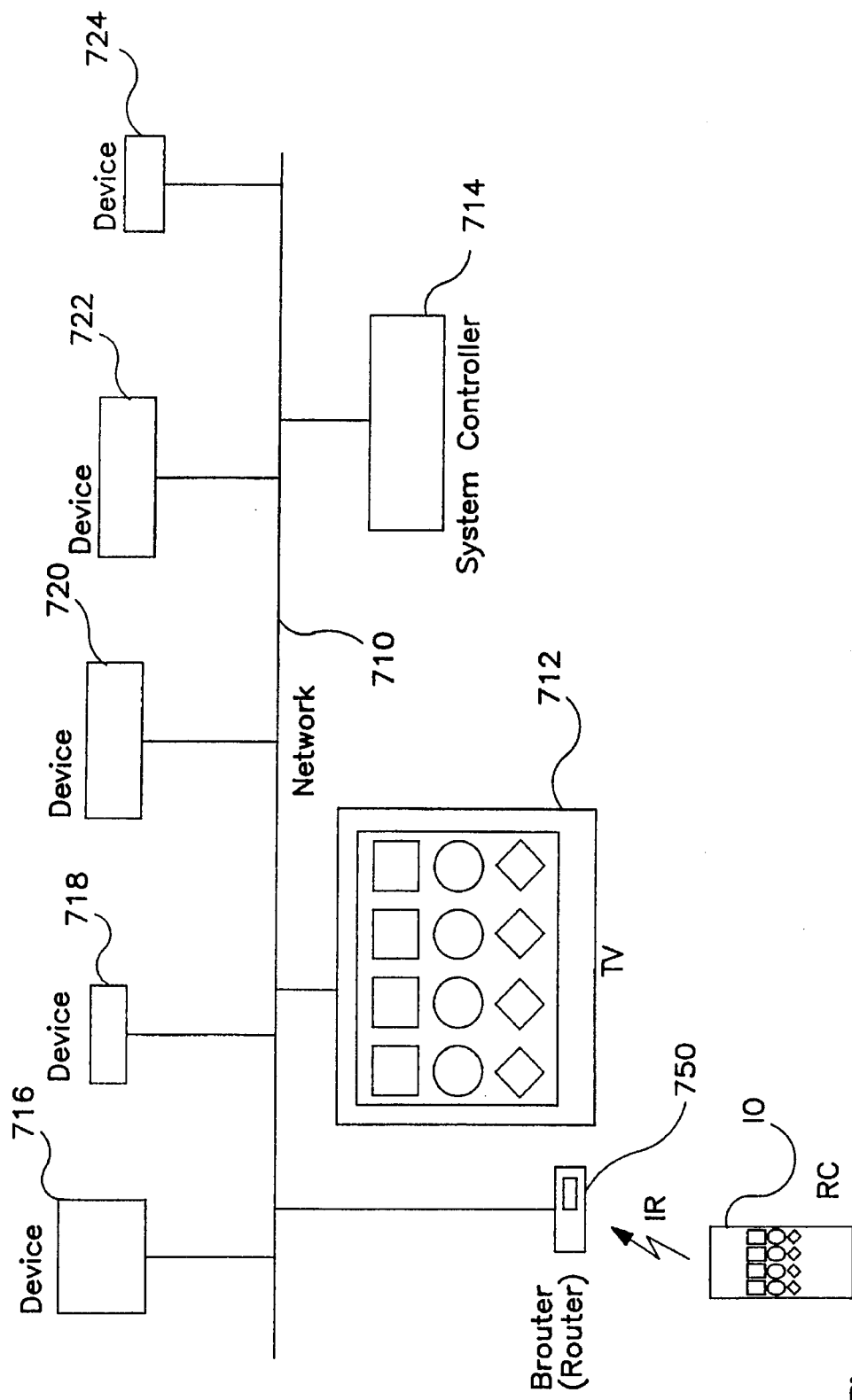
FIG. 7b is the high level functional block diagram of FIG. 7a including a brouter.

An alternate embodiment to this configuration is shown in FIG. 7b. In FIG. 7b, the remote controller 10 communicates directly with a brouter 750 which is directly connected to network 710. In this case, brouter 750 converts the IR signal into a signal compatible for transmission along the network 710 and forwards the packet accordingly. For example, brouter 750 could include the functionality to send a command directly to TV 712 or it can be configured such that all received commands are directed to system controller 714 which, in turn, distributes the commands accordingly.

Continuing with FIG. 7a, as mentioned above, the system controller 714 then executes the commands in accordance with the menu displayed at the time of the received command. It should be noted that in the exemplary embodiment of the present invention, the functions of the system controller 714 (e.g., menu generation, command distribution) are performed by a personal computer connected to network 710. As appreciated by those skilled in the art, as with the interface box 718, the functions of the system controller may be integrated within another device such as TV 712.

If the device includes a processor and sufficient memory, the menu generating functions may be implemented using that processor in a shared mode.

It should be noted that the CEBus differs from most LANs in that its architecture provides for a control channel as well as data channels. Data channels are presently supported on the TPBus and CXBus. Both a TPBus and CXBus are wideband media, and are able to support a large number of signals that have been spectrally multiplexed onto the medium. The control channel is a narrow band signal used as a party line for products connected with the medium. Communication on the party line is by digital packetized signalling where a packet is a bundle of "1s" and "0s" arranged in a set of fields that include a destination address field and a message field.

Products use the control channel to send short commands, a small amount of data, or to negotiate for spectrum space in which to place their signals which are inappropriate for the control channel. The data signals may be inappropriate because of the modulation type, duration, or bandwidth needed to accommodate them. In the exemplary embodiment, the CXBus is selected because of its ability to handle wideband signals such as digitized audio and video.

Continuing with FIG. 7a, many home system devices such as lighting, HVAC and/or security may be indirectly coupled to network 710 through a bridge/router, for example device 716, and a PLBus. In this case, the options selected via a menu are sent out as commands to the PLBus devices via bridge/router 716. Generally, bridge 716 may change the format of the command to be delivered to one of the PLBus devices and also it may drive the command with different signal levels depending on the appropriate standards.

Figure 8:
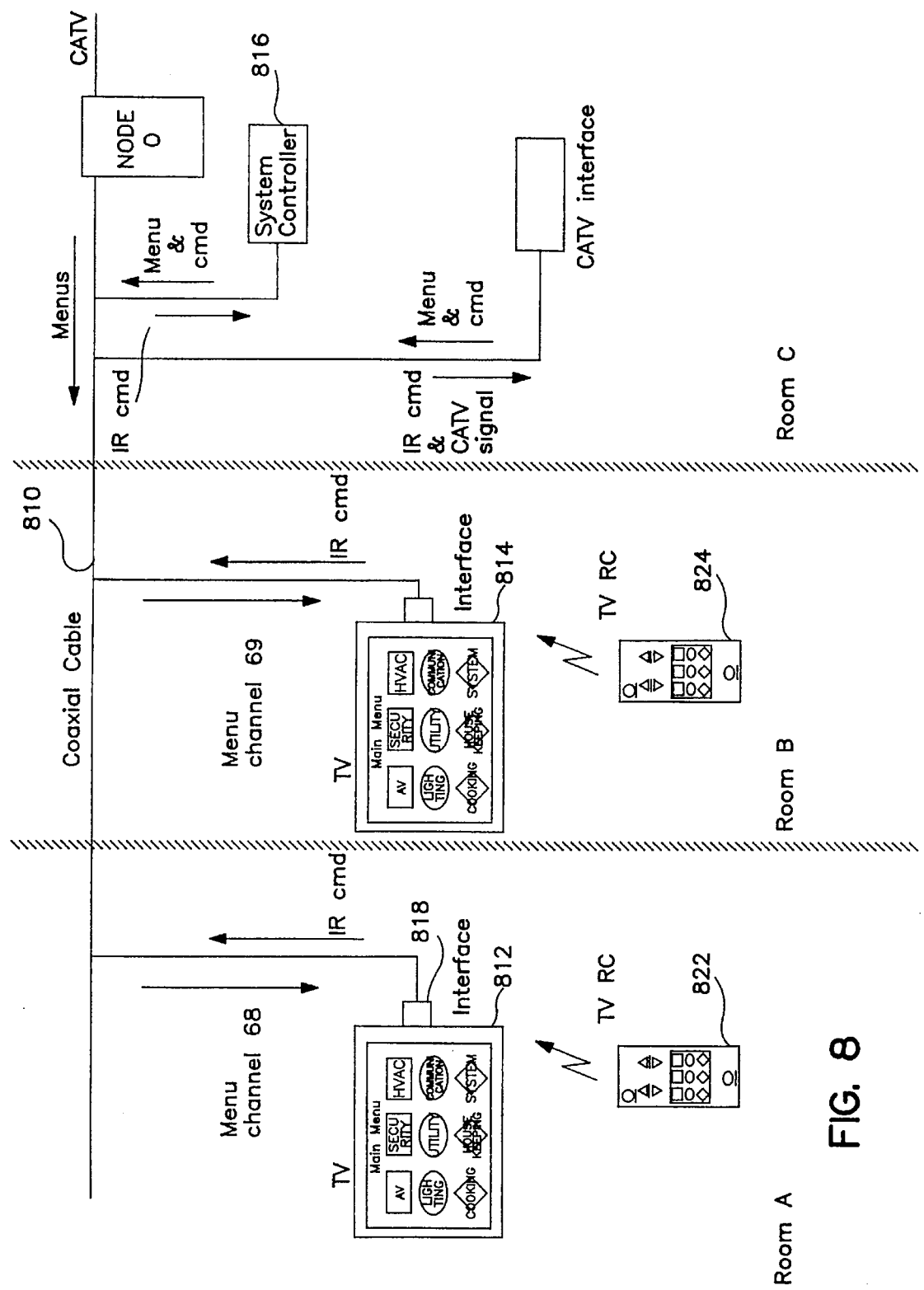
FIG. 8 is a high level functional block diagram of the network shown in FIG. 7a employed in an exemplary application.

FIG. 8 shows a functional illustration of an exemplary application employing the present invention. As shown in FIG. 8, two TVs 812 and 814 are connected, via an appropriate interface, to CXBus 810. Commands are received by the respective TVs from remote controllers 822 and 824. These commands are delivered to system controller 816 which, in turn, executes the commands.

By way of example, a user in Room A presses the "menu" button on remote controller 822. This generates an IR packet with the command "menu", which is sent to the TV 812. The CEBus network interface 818, attached to the TV 812, in turn generates a menu-request CEBus packet to the system controller 816 in Room C, over the coaxial cable 810. The system controller 816 receives that packet, which triggers generation of a menu. The base band video output, representing the requested menu, from the system controller 816 is modulated to be sent over a video channel, for example, channel 7.

This signal is converted to an available, higher channel such as channel 68 by another processor, for example, "Node 0". It should be noted that in general a Node 0 performs the following functions:

1) combines the signals from the internal cable;
2) block frequency converts data channel signals for distribution back on the internal or external cables;
3) amplifies block converted data channel signals to drive the required number of external or internal cable branches, overcoming the losses of splitters and cables;
4) provides amplification for distributing CATV or OFF-Air TV signals;
5) provides, optionally, a CATV signal return path for two-way cable services; and
6) provides control channel regeneration and distribution on all internal cables.

The need to place the video signal representing the menu on a higher channel arises from the CATV connection to the coaxial cable 810. The CATV connection uses the lower channels, therefore, the menus are sent over unused or available channels on the higher end of the available spectrum.

In the present case, system controller 816 is providing menus for two separate TVs thus two separate channels (e.g., channels 68 and 69) are used.

Continuing with FIG. 8, along with the video signal representing the requested menu, control information is sent to TV 822. The control information is used to automatically tune TV 812 to channel 68 thereby permitting the user to see the requested menu on the TV screen.

It should be noted that since, in the exemplary embodiment of the present invention, a personal computer is used to generate the menus and execute the commands, an optional feature of the present invention is menu modification and/or menu building by the user. In this way, a user can customize the options displayed on any given menu, although the distinctive arrangement corresponding to the remote controller would remain constant, or would only be modified among a set of predetermined menu formats corresponding to respective different remote control devices.

Another optional feature of the present invention is automatic menu option generation. This is accomplished by having the system controller periodically poll the network, including all busses (e.g., CXBus, TPBus, PLBus) to determine which devices are connected/available for use which, if possible, includes the status of a particular device (i.e., VCR is currently recording). And, with an additional device identifier (i.e., one that indicates from which rooms this device may be controlled), menus can be generated depending from which room the menu is being requested.

Although the invention is illustrated and described herein as embodied in a method and system for on-screen menu activation, the invention is not intended to be limited to the details shown. Rather, various modifications may be made in the details within the scope and range of equivalents of the claims and without departing from the spirit of the invention.

What is claimed:

1. Apparatus for controlling devices from a remote location, comprising:

control keypad means having multiple actuators in a distinctive arrangement such that the multiple actuators are arranged in a plurality of rows and a plurality of columns, wherein each of the plurality of rows or columns includes actuators having a common physical attribute, common physical attributes for adjacent rows or columns being different;

display means, located remotely from the control keypad, for displaying a control menu;

means for generating the control menu, wherein the control menu presents a plurality of options in a format including a plurality of rows and a plurality of columns having common row or column physical attributes which match the distinctive arrangement of the multiple actuators on the control keypad means; and means responsive to the plurality of actuators for executing a corresponding control menu option when selected by an actuator of the control keypad means.

2. The apparatus of claim 1, wherein the common attribute is color.

3. The apparatus of claim 1, wherein the common attribute is color or shape.

4. The apparatus of claim 1, wherein the display means is a television.

5. The apparatus of claim 1, having 3 rows and 3 columns.

6. The apparatus of claim 1, having 3 rows and 4 columns.

7. The apparatus of claim 1, having 4 rows and 3 columns.

8. The apparatus of claim 1, having 4 rows and 4 columns.

9. The apparatus of claim 1, wherein the common attribute is physical shape.

10. A method for controlling devices from a remote location comprising the steps of:

providing, on a control keypad means, a distinctive arrangement of multiple actuators such that the multiple actuators are arranged in a plurality of rows and a plurality of columns, wherein each of the plurality of rows or columns includes actuators having a common physical attribute, common physical attributes for adjacent rows or columns being different;

generating a control menu, for controlling the devices, which presents a plurality of options including a plurality of rows and a plurality columns having common row or column physical attributes in a format which matches the distinctive arrangement of the actuators on the control keypad means;

displaying, remotely from the control keypad means, the control menu; and activating an actuator such that a menu option corresponding to the activator in the distinctive arrangement is executed.

11. The method of claim 10, wherein the common attribute is color.

12. The method of claim 10, wherein the common attribute is color or shape.

13. The method of claim 10, wherein the common attribute is physical shape.

14. A method for controlling devices from a remote location comprising the steps of:

providing, on a control keypad means, an array of actuators in a plurality of rows and a plurality of columns such that each actuator in a respective row includes at least one common physical attribute and each actuator in a respective column includes at least one common physical attribute, where common physical attributes for adjacent rows or columns being different;

generating a video signal representing a control menu, for controlling the devices, which presents a plurality of options in a format including a plurality of row and a plurality of columns having common row or column physical attributes which matches the array of the actuators on the control keypad means;

displaying, remotely form the control keypad means, the control menu; and activating an actuator such that the displayed menu option corresponding in array location to the activated actuator is executed.

15. The method of claim 14, wherein the common attribute is color or shape.

16. Apparatus for communicating remotely, comprising:

control keypad means having multiple actuators arranged in art array having at least three rows and at least three columns, each of said rows having a common physical attribute, each of said columns having a common physical attribute, the common attributes of adjacent rows being different, the common attributes of adjacent columns being different;

display means, located remotely from the control keypad, for displaying a control menu;

means for generating the control menu, wherein the control menu presents a plurality of options in a format including a plurality of rows and a plurality of columns having respective row and column attributes which match the attributes of the control keypad means; and means responsive to the plurality of actuators for executing a corresponding control menu option when said option is selected by an actuator of the control keypad means.

* * * * *

UNITED STATES PATENT AND TRADE MARK OFFICE
CERTIFICATE OF CORRECTION

PATENT NO.   : 5,598,523
DATED        : January 28, 1997
INVENTOR(S)  : Fujita

It is certified that error appears in the above-identified patent and that said Letters Patent is hereby corrected as shown below:

Column 8, line 62, delete the word "art" and insert therefor --an--.

Column 8, line 48, the word "row" should read --rows--.

Column 8, line 52, the word "form" should read --from--.

Signed and Sealed this

Second Day of September, 1997

Attest:

BRUCE LEHMAN

Attesting Officer

Commissioner of Patents and Trademarks